United States Patent [19]

Nelson et al.

[11] 4,297,376

[45] Oct. 27, 1981

[54] CORN-BASED SNACK PRODUCT OF NUT-LIKE CONSISTENCY

[76] Inventors: Richard L. Nelson, 699 Riverside Dr., Battle Creek, Mich. 49015; Walter P. Nelson, 4045 Gull Lake Dr. West, Richland, Mich. 49083

[21] Appl. No.: 130,749

[22] Filed: Mar. 17, 1980

[51] Int. Cl.³ .............................................. A21D 2/36
[52] U.S. Cl. .................................... 426/94; 426/104; 426/549; 426/808; 426/803
[58] Field of Search ............... 426/549, 808, 559, 560, 426/94, 104, 289, 295, 144, 629

[56] References Cited

U.S. PATENT DOCUMENTS

| | | | |
|---|---|---|---|
| 3,149,978 | 9/1964 | Anderson et al. | 426/439 |
| 3,368,902 | 2/1968 | Berg | 426/559 |
| 3,676,150 | 7/1972 | Glicksman et al. | 426/549 |
| 3,719,497 | 3/1973 | Galle et al. | 426/104 |
| 4,212,892 | 7/1980 | Chachine et al. | 426/289 |

OTHER PUBLICATIONS

Tighe E., et al.; "Woman's Day Encyclopedia of Cookery"; vol. 10; Fawcett Pub. Inc.; ©1966, p. 1647.

*Primary Examiner*—Joseph M. Golian
*Assistant Examiner*—Elizabeth J. Curtin
*Attorney, Agent, or Firm*—Fisher, Gerhardt, Crampton & Groh

[57] ABSTRACT

An edible three dimensional food product and composition. The composition contains about five percent by weight of an uncooked, unhulled sesame seed, a minor amount of an oil rejection material, and a matrix of ground corn dough. Also disclosed is an apparatus for molding the composition into a relatively thick shaped item.

11 Claims, 3 Drawing Figures

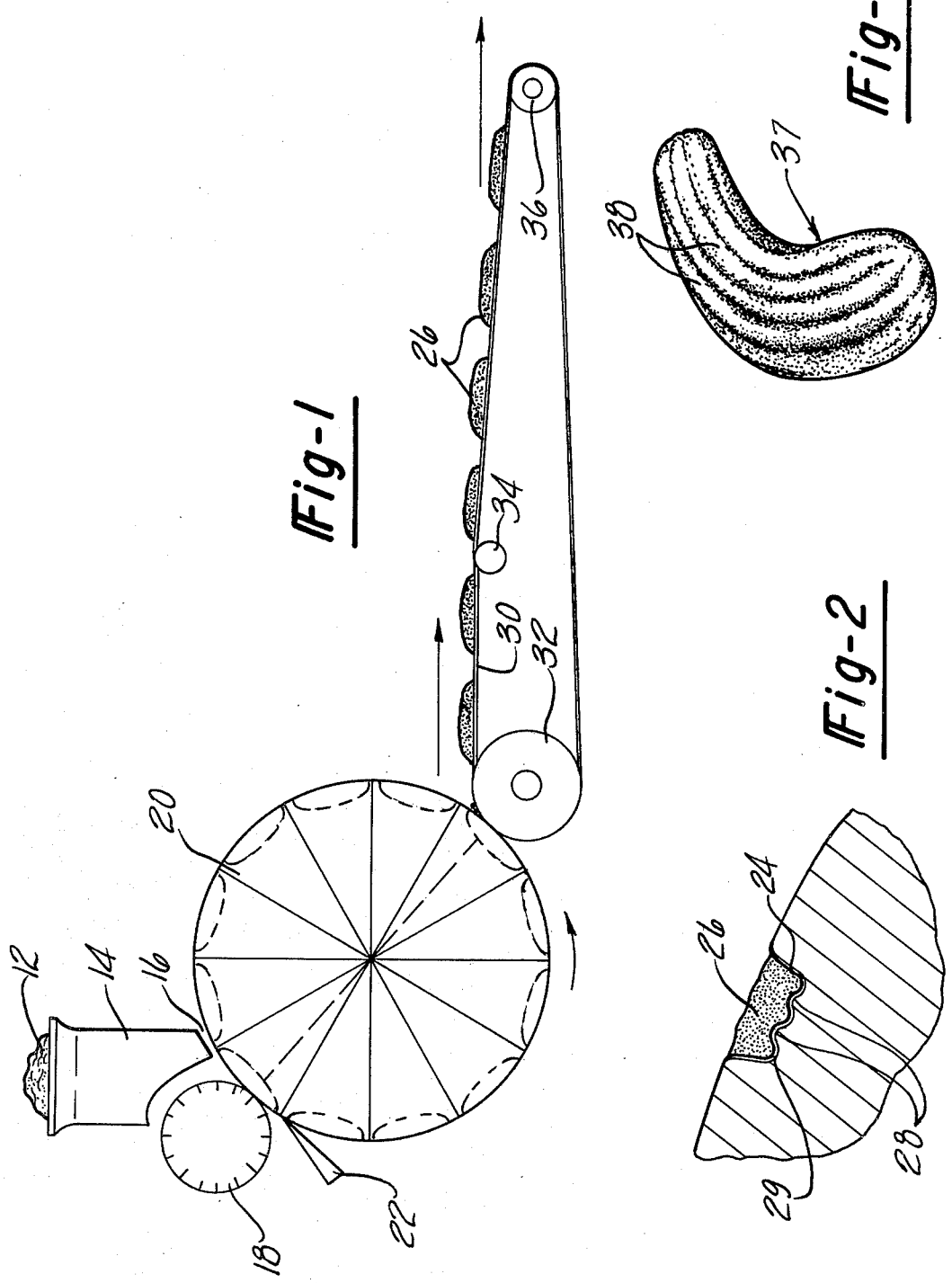

CORN-BASED SNACK PRODUCT OF NUT-LIKE CONSISTENCY

In one aspect this invention relates to edible, food snack type products. In a further aspect, this invention relates to a formulation useful for making edible food products. In yet a further aspect, this invention relates to an apparatus useful for forming starting materials into a relatively thick, three dimensional molded product suitable for further processing into an edible snack product.

Snack items made from corn dough as thin, substantially two dimensional shapes are well known in the art. The corn dough for such items is customarily made by cooking corn in the presence of lime, grinding the processed cooked corn into a dough, adding various materials to provide the desired dough consistency, and extruding the dough as a flat sheet which is then cut into discrete pieces. The discrete pieces are dropped into hot fat and cooked for a matter of two to four minutes to form this well known snack food. Such snack items have a distinctive shape and taste as well as a characteristic crunchy texture.

In view of the rapidly escalating price of nuts and their limited availability it would be desirable to have a nut-like, three dimensional product having the appearance and texture of a nut but formed from a more readily available material such as corn. The resulting product should have the thickness and dimensions which are characteristic of a nut and also possess the bite normally associated with nuts. It would also be desirable that the formulation used in making the nut absorb a minimum of the frying oils to increase the shelf life of the product.

Accordingly it is an object of this invention to provide a new multi-dimensional corn product having a substantial thickness.

It is a further object of this invention to provide an apparatus for molding corn dough into a form which can be cooked to form the product of this invention.

It has yet a further object to provide a new dough composition which when formed and fried will have a nut-like bite and a substantial shelf life.

Briefly, the product of this invention is an edible food including a substantial portion or matrix of ground corn dough to which has been added approximately one to ten percent by weight of an uncooked, unhulled sesame seed material and about 0.5 to 2 percent by weight of a granular algin material. When fried in hot fat the product of this invention provides a snack with bite similar to that of natural nuts.

If desired the food product can also contain about five to fifteen percent of whole corn germ.

Various flavoring materials such as salt, cheese flavor, onion flavor and the like can additionally be coated on the product after deep frying to achieve various desirable flavors.

In the accompanying drawing:

FIG. 1 is a schematic diagram of an apparatus for molding the corn dough material of this invention into a shaped mass suitable for frying to form a finished product;

FIG. 2 is a cross-sectional view of the engraved roll of FIG. 1 showing a cavity filled with corn dough; and FIG. 3 is a perspective view of one configuration of a molded food stuff according to this invention.

The basic ingredient used in preparing the mixture of this invention is ground corn dough. Ground corn dough is normally made by cooking dried raw corn in water with a quantity of lime for approximately one hour and then steeping the cooked corn in water for an extended period of time up to about eight to sixteen hours. After cooking, steeping and washing, the washed corn is milled by means of a standard corn mill to form a milled doughy product. Production of corn dough is well known in the art and further details of the preparation of ordinary corn dough is omitted in the interest of brevity.

The corn dough having a substantial amount of moisture is slowly blended with about one to ten percent by weight of unhulled, uncooked sesame seeds. The sesame seeds added to the corn dough in amounts of about one to ten percent provide additional bite to the cooked snack which provides a feel in the mouth similar to that of normal nut meats. The sesame seeds are preferably added in an amount of about four to six percent, addition of seeds in this range giving the best combination of mouth feel and flavor to the finished product. The sesame seeds provide a combination of texture, flavor, mouth feel and a pleasing after taste to the resulting fried article. Seeds in excess of about ten percent overpower the other flavors present and result in a brittle product which is easily broken and is too friable for convenient handling or storage. Too few sesame seeds result in a product with lessened flavor and the resultant product after frying tends to be tougher.

About 0.5 to 2 percent by weight of a protein material such as kelp algin available under the trademark "Kaltose" from Kelco, 20 N. Wacker Dr., Chicago, Ill., is added to the corn dough. It has been found that addition of the algin helps stabilize and control oil absorption when a mass of the mixture is being fried. Controlling oil absorption allows the production of a relatively thick product having a nut-like shape which does not have an oily taste or after taste thereby providing an acceptable snack product. Also, by minimizing the amount of oil absorbed during the cooking process, the shelf life of the product is substantially extended. The addition of the one-half to approximately two percent by weight algin increases the shelf life from about three weeks without algin to a period exceeding six months with algin. The addition of the oil absorbing control keeps the amount of oil absorbed to less than about fifteen percent by weight of the finished product.

In a preferred mixture, toasted corn germ is also added at a rate of about five to fifteen percent by weight. Corn germ has a natural composition of about twenty-nine percent fat, eighteen percent fiber and eighteen percent protein. Corn germ when toasted has a pleasing popcorn flavor which adds to the flavor of the final food product. Addition of corn germ also provides an additional textural quality to the final product and additional nutritive value.

Additional minor ingredients can be added to the mixture prior to the molding of the mixture into a shaped article for frying. One example would be a powdered natural butter flavoring which can withstand the heat of frying; one example is Edlong #6002. Flavorings can be added in amounts of about one-half percent or less by weight into the corn dough and thoroughly mixed. Other possible additives could be flavor enhancers added in minor amounts which are insufficient to substantially modify the texture of the dough preparatory to molding.

As formed, the dough will have a moisture content of approximately forty to fifty percent. This degree of moisture forms a mixture which is substantially cohesive and which can be easily extracted from a mold. Moisture contents below about forty percent will provide a dry, crumbly product which is not easily molded nor extracted from an engraved roll during processing. Moisture contents substantially above fifty percent provide a dough which is too moist and difficult to handle, and may not mold and unmold properly.

The dough of this invention is essentially free of added fats or oils; the only fats present are those naturally present in the starting ingredients.

Referring to the accompanying drawing, the mixture of this invention designated 12, is placed in hopper 14 and fed into the nip 16 between the feed roll 18 and an engraved roll 20. The engraved roll 20 contains a multiplicity of shaped cavities 24 adapted to receive the dough, the feed roll 18 firmly forcing the dough into the cavities. A doctor blade 22 removes the excess dough from the surface of the roll leaving a shaped dough mass 26 within the cavity 24.

The resulting mass of dough is shown in greater detail in FIG. 2 wherein the mass of dough 26 within the cavity 24 shows an inner surface having a plurality of grooves 28 which run along the length of the formed mass of dough. Also shown is the fact that the die cavity has been lined with a layer 29 of low adhesion material permitting easy release of the molded food stuff from the cavity. One example of such a material is polytetrafluoroethylene, a well known low friction, low adhesion material commonly available under the trademark "Teflon".

After the excess dough has been removed by the doctor blade 22, the engraved roll 20 rotates until the molded mass of dough 26 comes in contact with an endless fabric belt 30. The belt is supported at one end by means of a firm elastomeric roll 32. The elastomeric roll 32 presses the fabric belt against the surface of the engraved roll bringing the fabric belt into intimate contact with the exposed surface of the molded dough. The radius of the elastomeric roll 32 and the angle of the cavity 24 with the engraved roll's surface are adjusted so that the fabric belt will withdraw the mass 26 from the cavity. The adhesion between the fabric belt and the dough is sufficient to pull the dough from the die cavity and adhere the molded mass to the belt for transport. The belt 30 passes over an idler roll 34 until it comes to a nose bar or nose roll 36. The nose roll 36 has a very small diameter, on the order of $\frac{1}{4}$ to $\frac{1}{2}$ inch, which forces the fabric belt 30 to make a sharp turn about the roll. As the molded mass of dough 26 passes around the sharp radius, the adhesion is broken and the molded mass 26 of dough will be detached from the fabric belt 30. The molded mass 26 is then transferred to conveyor means, such as those well known in the art, for conveyance into a deep fat fryer.

The molded masses of dough are immersed in a deep fat fryer filled with a stable hydrogenated vegetable oil classed as 100 AOM fat and cooked for approximately six to ten minutes at about 350° F. Such deep fat fryers and the temperature at which they are operated are known in the art, the frying process being a standard process for producing snack foods. The important variations from the normal fat frying process are: the length of frying time which is eight minutes, whereas the normal snack food is only fried for a matter of two to four minutes; and the product is transported through the fat on the underside of a frying mechanism to hold the product underneath the surface of the fat. Holding the product immersed within the fat is desirable since the product is relatively thick and would normally float on the top of the grease thereby essentially only cooking one side of the product.

During french frying, the sesame seeds and, when included, the toasted corn germ, are expanding and imparting their flavor to the corn network to condition the product with a network of the seeds and toasted corn germ. The resulting fried product has a tender crunchy bite and a pleasing and somewhat nutty taste, mouth feeling and aftertaste. After frying, the product can be passed through a seasoning tumbler, such tumblers being well known in the art. The tumbler is used to apply the desired seasoning. Examples of suitable seasoning or flavoring agents are salt, cheese, sour cream and onion. The various flavors and techniques are the same as those used for coating various corn chips, farina or other starch chip products. The fried products also could be coated with thin layers such as chocolate or candy or both.

The product of this invention when fried has an appearance or form somewhat similar to that of a nut. As shown in FIG. 3, the shape of the product has been formed so as to resemble a cashew nut 37, or portion thereof. Of course other forms could be used. The form shown has two curved longitudinal grooves 38 running the length of the formed product. These grooves extend into the body of the nut, provide an interesting texture, and have a functional underlying rational. The grooves in the product decrease the distance between the interior portions of the product and the hot oil contacting the surface of the product during frying. Thus, the distance that the hot oil needs to penetrate from the surface of the molded mass to reach the center cross-sections of the product is substantially reduced. This speeds the frying process and insures that the frying oil will permeate the product. Without proper frying, the texture of the resultant article would be soft and mushy and not crunchy and nut-like.

The moisture content of the final product has been reduced from approximately forty-four percent in the as-formed mass going into the deep fat fryer down to a maximum amount of about one-half to three percent moisture. The low moisture content also contributes to the long shelf life of the finished product. Preferably the moisture content is about one percent by weight to provide a strong, long-lived product.

It is apparent from the foregoing description that a new mixture useful for being molded into a product to be fried, the resulting product, and an apparatus for producing said product have been disclosed. Various modifications and alterations of this invention will become apparent to those skilled in the art without departing from the scope and spirit of this invention.

What is claimed is:

1. A method of making an edible food product having a binder of ground corn dough comprising the steps of: preparing a ground corn dough; adding about one to ten percent by weight of uncooked, unhulled sesame seeds and about 0.5 to 2 percent by weight of algin to form a firm doughy mixture having about forty to fifty percent by weight water; molding said mixture to form a relatively three-dimensional raw article having a thickness which is at least about twenty-five percent of the width of the molded mixture forming a raw article; frying said raw article in oil, at about 325°–375° F., for a period of about six to ten minutes to thoroughly cook said article to a crunchy nut-like consistency.

2. The method of claim 1 comprising the additional step of tumbling the cooked article in a flavoring ingredient to coat said fried article.

3. The method of claim 1 wherein said article has depressions formed in the surface thereof so as to provide that no part of the article is further from the surface of said article than a distance equal to approximately one-half the height of said article.

4. The method of claim 1 wherein said ground corn dough has about five to fifteen percent by weight of toasted corn germ added to said dough prior to molding.

5. The method of claim 1 wherein said raw article is held below the surface of said fat during the frying procedure.

6. The product produced by the process of claim 1.

7. The edible food product of claim 6 containing about five to fifteen percent by weight of toasted whole corn germ.

8. The edible food product of claim 6 wherein said product is additionally coated with a flavoring material.

9. The edible food product of claim 6 wherein said product has a composition of about four to six percent by weight of uncooked, unhulled sesame seeds.

10. The edible food product of claim 6 including about 0.1 to 1 percent by weight of a flavor enhancer.

11. The product of claim 6 or 10 including solid, powdered natural butter flavoring.

* * * * *